S. W. Shailer,
Saw,
Nº 105,261.  Patented July 12 1870.
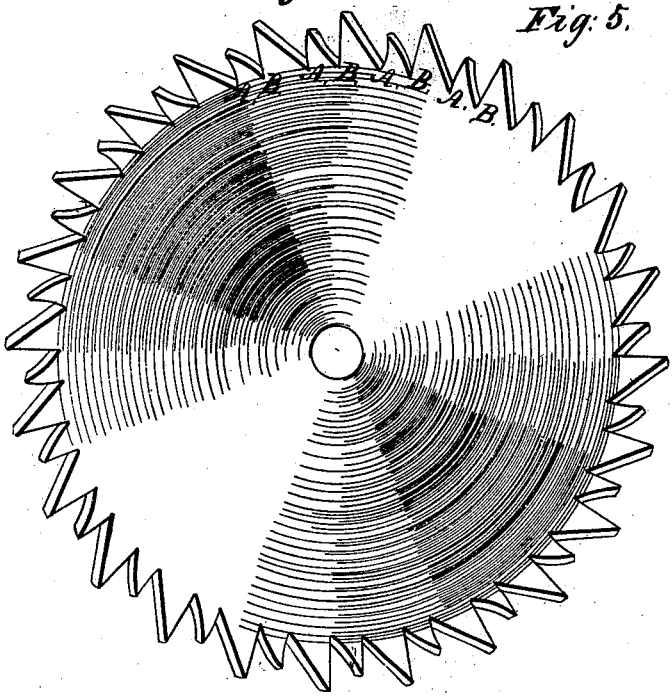
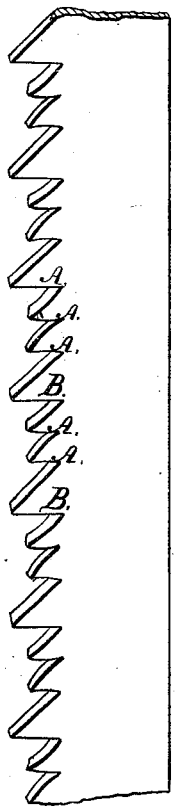
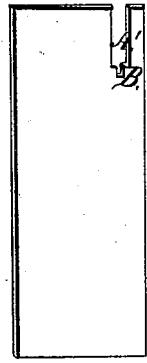
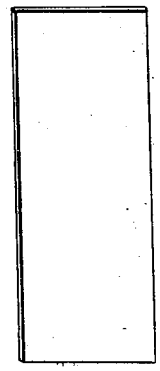
Witnesses:
S. H. Wilder
John Child
Inventor:
Simon W. Shailer

United States Patent Office.

SIMON W. SHAILER, OF DEEP RIVER, CONNECTICUT.

Letters Patent No. 105,261, dated July 12, 1870.

IMPROVEMENT IN SAWS.

The Schedule referred to in these Letters Patent and making part of the same

*To all whom it may concern:*

Be it known that I, SIMON W. SHAILER, of Deep River, in the town of Saybrook, State of Connecticut, have invented an Improvement in Saws for Cutting Ivory; and I do hereby declare that the following is a full and exact description thereof, which will enable others skilled in the art to make and use the same, reference being had to the accompanying drawings, and to the letters of reference marked thereon.

My invention relates to the class of saws constructed with a plate increasing in thickness toward the center or back, and consists in making the rim of said plate thin, and supporting it with teeth of different lengths, bent in such relation to each other that the shorter teeth shall make a wider kerf than the longer, and allow the longer teeth to co-operate with the beveled plate in preventing the vibration of the saw, to enable it to operate with less width of cut and save a portion of the stock operated upon, and produce a smooth surface on the work.

I construct the plate of my circular saw in the usual form, that is, with the standing or face side flat, and the opposite side beveled outwardly or diverging from the edge of the plate or a line near the edge, to the shaft, and apply thereto the usual driving attachment and guides to steady it, but further guard it against vibration by providing it with relatively long and short teeth alternating with each other singly or otherwise, and bending the shorter teeth so that they may make a wider kerf than the longer, as illustrated in Figure 1 of the accompanying drawings, in which the short teeth are shown at A, and the long at B, and are represented on an enlarged scale, without reference to their practical proportions, to more clearly represent their relations.

This arrangement enables the short teeth to free that portion of the long which comes within their radius, in consequence of which the long teeth require but little if any set, and make a narrow kerf in which they check the vibration of the thin edge of the plate, and cause it to run true with the thick center or body, and the saw is thereby enabled to clear itself with less set, and finish its work more smoothly than when made in the ordinary proportions.

But this arrangement of the teeth also admits of a thinner rim to the saw-plate than it has heretofore been practical to use, as by it the labor is divided between the two sets of teeth, and vibration is checked at the extreme diameter of the saw, where it can be less effected by guides or the thick body of the plate; and the greater elasticity of the short teeth, thus made thin, enables them to track more perfectly, and prevents them from scoring the work deeply.

Relative specimens of work are illustrated by Figures 2 and 3, fig. 2 being the sketch of a piece of ivory cut by an ordinary saw, and having in it the representation of a kerf, A' B', as made by the arrangement of teeth before described; and fig. 3, the sketch of a similar piece of ivory cut for a piano-key facing by a saw constructed according to my improvement. The practical number of teeth to the inch for doing similar work may vary from fourteen to eighteen.

Figures 4 and 5 show an exaggerated view of like teeth applied to a straight saw. In such application the back of the saw should be sufficiently thick to make it run true, and then the arrangement of teeth represented, in connection with the back of the saw, will check the vibration of the edge when made very thin, and enable it to operate in line with the back.

I disclaim the combination and arrangement of teeth of different lengths, as follows:

First, when the long and short teeth are bent to an equal set.

Second, when the long teeth are bent and the short left straight.

Third, when the short teeth are upset so as to cut a wider track than the log.

Fourth, when the short teeth are split so as to cut a wider track than the log.

What I claim as my invention, and desire to secure by Letters Patent, is—

A saw, beveled as described, and provided with teeth of different lengths, A and B, when the shorter teeth are bent to range beyond the longer laterally, as and for the purposes hereinbefore described.

SIMON W. SHAILER.

Witnesses:
    JOHN CHILD,
    S. H. WILDER.